United States Patent
Busquets et al.

(10) Patent No.: US 11,978,061 B2
(45) Date of Patent: May 7, 2024

(54) CASTING EMBEDDED HARDWARE ENCRYPTION

(71) Applicant: Robert Bosch GmbH, Stuttgart (DE)

(72) Inventors: Enrique Busquets, Greer, SC (US); Heiko Erlenkeuser, Anderson, SC (US)

(73) Assignee: Robert Bosch GmbH, Stuttgart (DE)

( * ) Notice: Subject to any disclaimer, the term of this patent is extended or adjusted under 35 U.S.C. 154(b) by 374 days.

(21) Appl. No.: 17/568,532

(22) Filed: Jan. 4, 2022

(65) Prior Publication Data

US 2023/0214540 A1  Jul. 6, 2023

(51) Int. Cl.
*G06Q 30/018* (2023.01)
*G06K 7/10* (2006.01)

(52) U.S. Cl.
CPC ....... *G06Q 30/018* (2013.01); *G06K 7/10257* (2013.01); *G06Q 30/0185* (2013.01)

(58) Field of Classification Search
CPC .. G06Q 30/018; G06Q 30/0185; G06Q 50/04; G06K 7/10257; G06K 19/07749; G06F 21/44; G06F 21/86
See application file for complete search history.

(56) References Cited

U.S. PATENT DOCUMENTS

| | | | |
|---|---|---|---|
| 7,034,689 B2 | 4/2006 | Teplitxky et al. | |
| 8,479,999 B2 | 7/2013 | Koujima et al. | |
| 8,633,858 B2 | 1/2014 | Nair et al. | |
| 9,070,068 B2 | 6/2015 | Coveley et al. | |
| 9,177,240 B2 | 11/2015 | Dokai et al. | |
| 2006/0269062 A1* | 11/2006 | Mihcak | G06K 19/086 380/255 |
| 2013/0201000 A1* | 8/2013 | Solomon | G07C 9/29 340/5.83 |
| 2020/0151738 A1* | 5/2020 | Guinard | G06Q 30/0185 |
| 2023/0138052 A1* | 5/2023 | Hellhund | G16H 40/63 283/74 |

FOREIGN PATENT DOCUMENTS

CA   2856363 A1 *  1/2015  ............ G06F 21/70

OTHER PUBLICATIONS

McCullagh, "Nikon's photo encryption reported broken", clnet, 2005, <https://www.cnet.com/news/nikons-photo-encryption-reported-broken/>, 3 pages.

* cited by examiner

*Primary Examiner* — Tuyen K Vo
(74) *Attorney, Agent, or Firm* — Michael Best & Friedrich LLP

(57) ABSTRACT

An anti-counterfeit product of manufacture includes a housing defining a cavity. The housing is constructed of a first and second bodies forming an original joint at a parting line. Inner workings of the product are enclosed within the cavity. An encryption device includes an encryption-coded ceramics-based pin grid array embedded in the first body of the housing. An RFID circuit is connected with the ceramics-based pin grid array. The RFID circuit is configured to report out a confirmation signal based on the code set by the connected ceramics-based pin grid array upon an RFID reader interrogation trigger. The RFID circuit is programmed to prevent future reporting of the confirmation signal upon detachment of the ceramics-based pin grid array from the RFID circuit, such that the confirmation signal is configured to confirm both product authenticity and integrity of the original joint.

20 Claims, 5 Drawing Sheets

CASTING EMBEDDED HARDWARE ENCRYPTION

BACKGROUND

The present invention relates generally to encryption technology for anti-counterfeiting of physical manufactured products.

SUMMARY

In one aspect, the invention provides an anti-counterfeit product of manufacture including a housing defining a cavity. The housing is constructed of a first body and a second body forming an original joint with the first body at a parting line. Electrical and/or mechanical inner workings of the product are enclosed within the cavity. An encryption device includes both an encryption-coded ceramics-based pin grid array embedded in the first body of the housing, and an RFID circuit. The RFID circuit is connected with the ceramics-based pin grid array. The RFID circuit is configured to report out a confirmation signal based on the code set by the connected ceramics-based pin grid array upon an interrogation trigger from an RFID reader. The RFID circuit is programmed to prevent future reporting of the confirmation signal upon detachment of the ceramics-based pin grid array from the RFID circuit, such that the presence of the confirmation signal is configured to confirm both product authenticity and integrity of the original joint.

In another aspect, the invention provides an anti-counterfeit system including an authentic product of manufacture, an RFID reader, and an encryption device built into the product. The product includes a housing constructed of a first body and a second body forming an original joint with the first body at a parting line. Electrical and/or mechanical inner workings of the product are enclosed within the cavity. The encryption device includes both an encryption-coded ceramics-based pin grid array embedded in the first body of the housing, and an RFID circuit. The RFID circuit is connected with the ceramics-based pin grid array. The RFID circuit is configured to report out a confirmation signal based on the code set by the connected ceramics-based pin grid array upon an interrogation trigger from the RFID reader. The RFID circuit is programmed to prevent future reporting of the confirmation signal upon detachment of the ceramics-based pin grid array from the RFID circuit, such that the presence of the confirmation signal is configured to confirm both product authenticity and integrity of the original joint.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
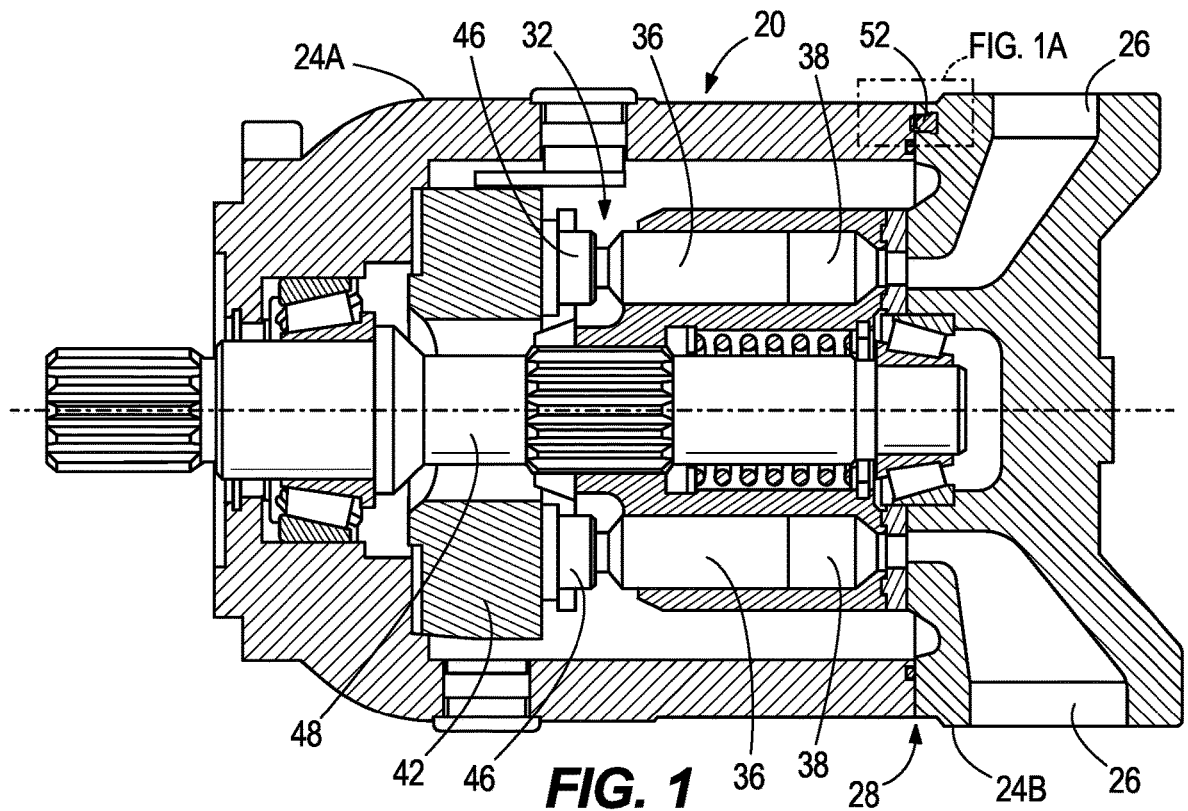
FIG. 1 is a cross-section view of an anti-counterfeit product of manufacture including an embedded encryption device.

FIG. 1 illustrates an anti-counterfeit product of manufacture 20 according to one aspect of the present disclosure. The product 20 includes a housing defining a cavity, the housing constructed of two bodies 24A, 24B. The two bodies 24A, 24B form an original joint 28 at a parting line of the housing. Inner workings (e.g., electrical and/or mechanical components) of the product 20 are enclosed within the cavity so as to be positioned partially of wholly within the housing and thus partially or wholly inaccessible from outside the housing. As illustrated, the product 20 is a pump including a main housing that forms the housing body 24A and a port block that forms the housing body 24B. A pumping mechanism 32 is provided in the main housing 24A as the inner workings of the pump. The port block 24B can include one or more fluid ports 26 (e.g., at least one inlet port and at least one outlet port). The pump can be an axial piston pump in which the pumping mechanism 32 includes a plurality of axially-reciprocable pistons 36 received in respective pumping chambers 38. Each piston 36 is coupled to a swash plate 42 by a shoe 46. The inner workings of the pump further include a shaft 48 supported by bearings for rotation within the housing such that rotation of the pumping mechanism 32 is operable to draw fluid in through one of the ports 26 and deliver a fluid outlet flow through another of the ports 26. It should be understood that the pump, and in particular the style and constructional details of the pump are merely one exemplary embodiment for the product 20, and that aspects of the present disclosure are not exclusively limited to such a product or products. Features described below for anti-counterfeiting measures applied to the pump can also be applied to a number of other diverse products of manufacture, for example within the vehicle industry among others.

Figure 1A:
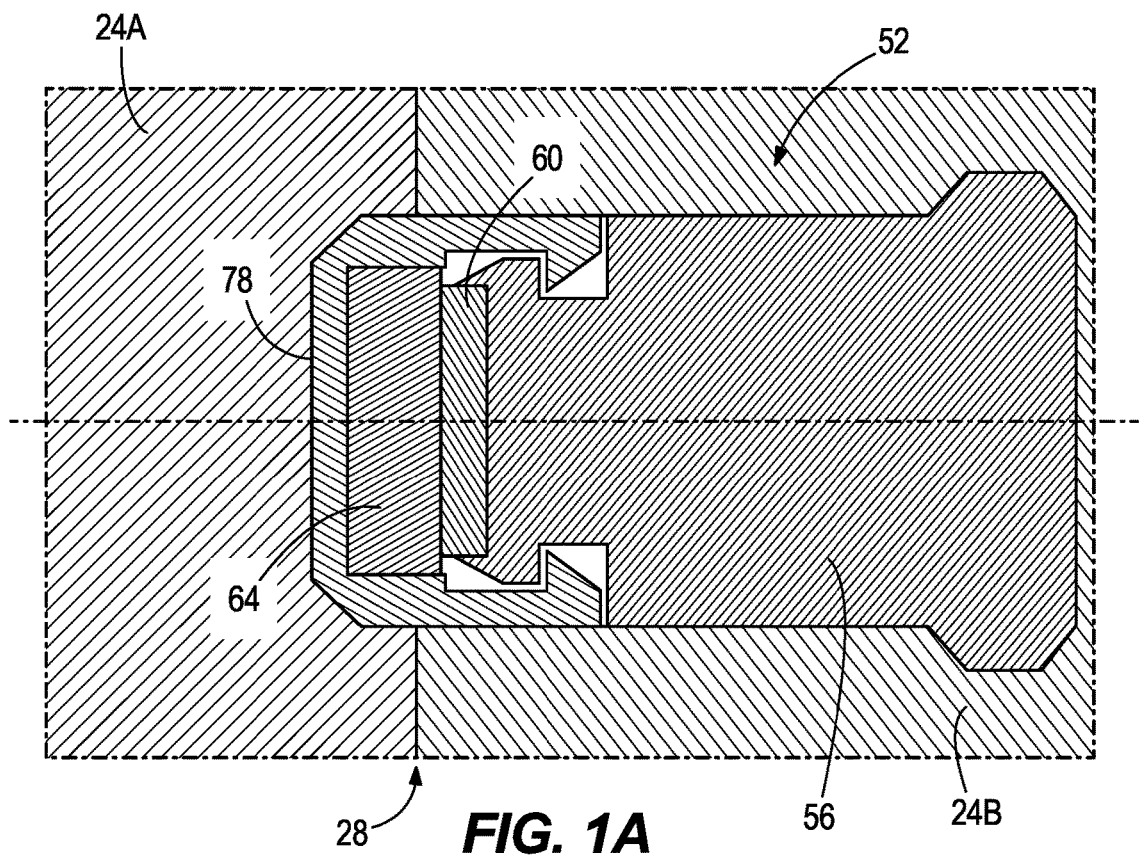
FIG. 1A is a detail view of the embedded encryption device in the product of FIG. 1.
Figure 2:
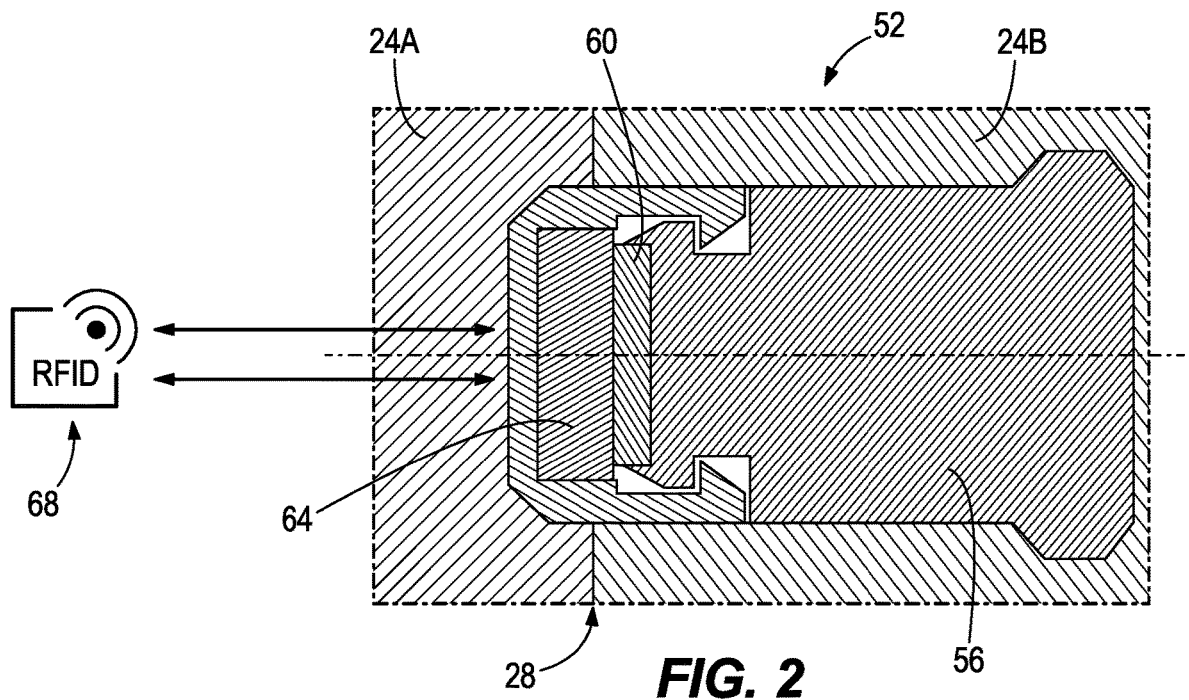
FIG. 2 is a schematic view of the in-tact embedded encryption device in communication with an RFID reader.

As shown in FIGS. 1 and 1A, the product 20 includes an encryption device 52. As described in more detail below, the encryption device 52 is built into the product housing at the parting line between the housing bodies 24A, 24B. The encryption device 52 includes a carrier, for example a ceramic carrier 56 embedded in one of the bodies of the housing—the housing body 24B as shown. In other constructions, the ceramic carrier 56 is instead embedded in the other housing body, and aspects of the following description are simply reversed. Regarding the ceramic carrier 56 being embedded in the housing body 24B, this may be accomplished by placement of the ceramic carrier 56 into a die or mold cavity during casting of the material (e.g., metal, such as die cast aluminum or cast iron, or plastic) forming the housing body 24B. The ceramic carrier 56 supports an encryption-coded ceramics-based pin grid array 60, which is described in further detail below. In short, the pin grid array 60 has a set encryption code upon its manufacture by the original equipment manufacturer of the product 20. The ceramic carrier 56 with the pin grid array 60 can be temperature resistant up to 1900 degrees Celsius. The encryption device 52 further includes an RFID circuit 64 connected, both mechanically and electrically, with the pin grid array 60. The RFID circuit 64, which in some constructions is a passive RFID circuit, is configured to report out a confirmation signal based on the pin grid array code in response to a radio frequency interrogation trigger signal from an RFID reader 68 (FIG. 2). The RFID circuit 64 includes an antenna and a digital I/O connected to the pin grid array 60, the connection therebetween being required for the RFID circuit 64 to report out the confirmation signal when pinged by the RFID reader 68. In some constructions, the ceramics-based pin grid array 60 provides 143-bit encryption with $1.115e43$ unique combinations. The encryption coding set by the original equipment manufacturer provides an anti-counterfeit measure to the product 20, as the RFID reader 68 will only confirm the product 20 to be authentic if it receives the encrypted confirmation signal from the RFID circuit 64. As noted, the encryption coding is not provided directly within the RFID circuit 64, but rather the pin grid array 60 to which the RFID circuit 64 is coupled within the product 20. In other words, the RFID circuit 64 is provided as a communication device, and not an encryption device. The pin grid array 60 provides encryption, but is not configured as a communication device on its own without the RFID circuit 64.

Figure 3:
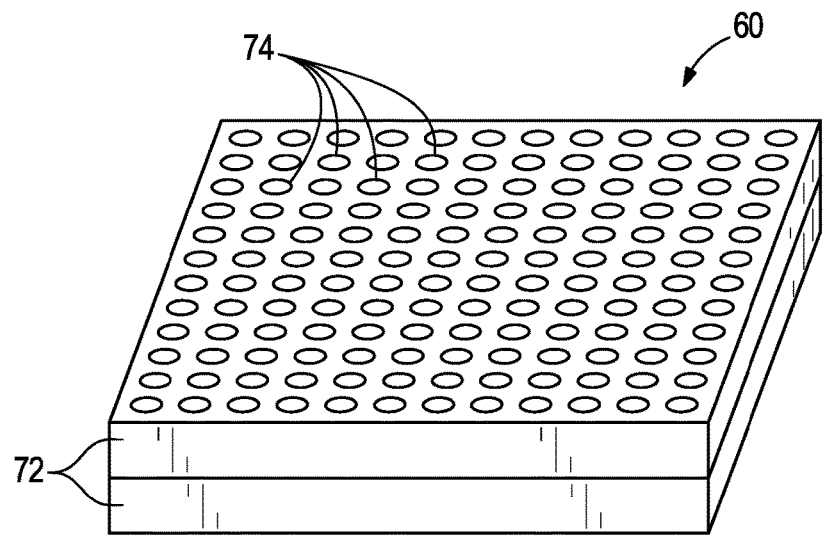
FIG. 3 is a perspective view of an encryption-coded LTCC pin grid array of the embedded encryption device.
Figure 4A:
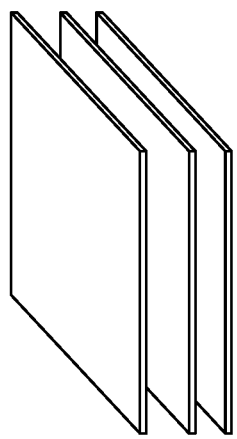
FIG. 4A illustrates a first step in a sequence of manufacturing production for the encryption-coded LTCC pin grid array of the embedded encryption device.
Figure 4B:
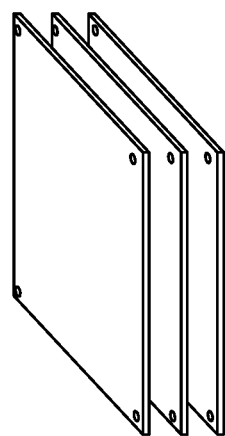
FIG. 4B illustrates a second step in the sequence of manufacturing production for the encryption-coded LTCC pin grid array of the embedded encryption device.
Figure 4C:
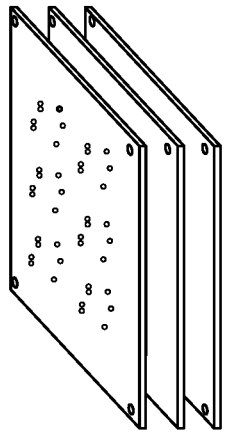
FIG. 4C illustrates a third step in the sequence of manufacturing production for the encryption-coded LTCC pin grid array of the embedded encryption device.
Figure 4D:
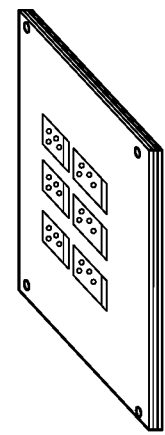
FIG. 4D illustrates a fourth step in the sequence of manufacturing production for the encryption-coded LTCC pin grid array of the embedded encryption device.
Figure 4E:
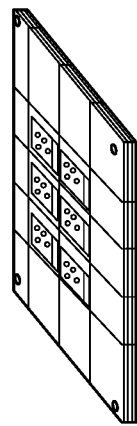
FIG. 4E illustrates a fifth step in the sequence of manufacturing production for the encryption-coded LTCC pin grid array of the embedded encryption device.
Figure 4F:
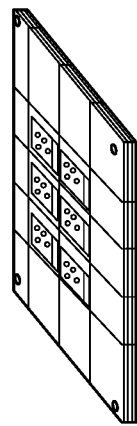
FIG. 4F illustrates a sixth step in the sequence of manufacturing production for the encryption-coded LTCC pin grid array of the embedded encryption device.
Figure 4G:
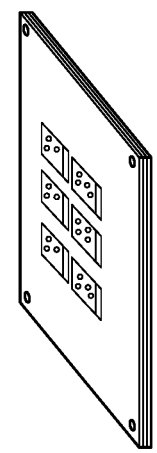
FIG. 4G illustrates a seventh step in the sequence of manufacturing production for the encryption-coded LTCC pin grid array of the embedded encryption device.

FIG. 3 shows the pin grid array 60 removed from the ceramic carrier 56. The pin grid array 60 can be a low temperature co-fired ceramic (LTCC) pin grid array. In other constructions, another type of ceramics-based pin grid array is used, such as high temperature co-fired ceramic (HTCC) or post-fired ceramics, either high temperature or low temperature. The LTCC pin grid array 60 consists of a plurality of stacked ceramic sheets or layers 72 having a grid of conductive and non-conductive pin positions 74 therein, the conductive pin positions formed as conductive vias. The grid of conductive and non-conductive pin positions 74 correspond to the digital I/O of the RFID circuit 64, which can include one pin position corresponding to each pin position on the LTCC pin grid array 60. Within the LTCC pin grid array 60, each pin position 74 conforms to a binary setting of either "1" for continuity, or "0" for no continuity. A 12×12 matrix of pin positions 74, with one pin position reserved for common ground (GND), enables the 143-bit encryption described above. Although FIG. 3 illustrates vias at all 144 pin positions, it will be understood that pin positions coded "0" for no continuity need not have any via formed. For a given series of similar products 20 manufactured by the original equipment manufacturer, the LTCC pin grid arrays 60 placed therein provide a unique encrypted identification code or "fingerprint" to each one. The RFID reader 68 contains an encrypted map of the identification code or "fingerprint" so as to allow the reader to know what message to expect for any given impulse or trigger.

FIGS. 4A to 4G illustrate an exemplary sequence of manufacturing of the LTCC pin grid array 60 described here. At step 4A, tape sheet blanks are manufactured, for example by laser cutting or other means. At step 4B, vias are formed in the tape sheets, for example by punching. It is suggested that the vias be created, selectively, at pin positions arranged in a 12×12 matrix, although other via configurations are optional for more or less encryption coding capability. For the sake of drawing clarity in FIGS. 4A to 4G, a reduced size pin grid array is shown rather than a full 12×12 matrix. As mentioned above, at pin positions to be coded as "0" for no continuity, vias need not be formed. At step 4C, the vias are filled with electrically conductive material, such as conductor paste containing gold or silver for electrical continuity from a first side through to a second side. At step 4D, conductor layers are applied onto the tape sheets, for example by screen printing. This step can produce a conductive grid to which all the conductive vias have electrical continuity. At step 4E, the tape sheets are stacked in alignment, via registration holes, and laminated together. At step 4F, the layers are sintered at a temperature below 1000 degrees Celsius, e.g. ~900 degrees Celsius. Step 4G illustrates the optional manufacturing technique of co-manufacturing groups of pin grid arrays, with individual circuits separated thereafter by dicing.

Finally, it is noted that there are a plurality of options for assigning the bits of the code and the position assignments throughout the pin grid array 60. For example, pin positions can be assigned in sequential order across each row, with each pin position representing the corresponding bit number of the unique multi-bit binary code, i.e., direct correlation. So, position 1 of the pin grid array is for the first code bit, position 2 of the pin grid array is for the second code bit, and so on, with the electrical ground assigned to one static pin position. In a first alternative which provides added security, the ground position is maintained at one static grid position while each of the pin positions used for bit coding has a randomly assigned bit number of the code, and the random assignment changes among the various manufactured parts. Thus, it is harder to guess which binary code is embodied in any given product in a counterfeit attempt. In this solution, the unique pin position to bit correlation is stored on an internal database. In a second alternative, both the coding bits and the ground are randomly assigned among all the various pin position of the pin grid array, thus making it even harder to guess or replicate the code. Compared to the first alternative, no additional storage is needed in an internal data base, but a matched assembly of a specific electronic circuit may be required.

Figure 5:
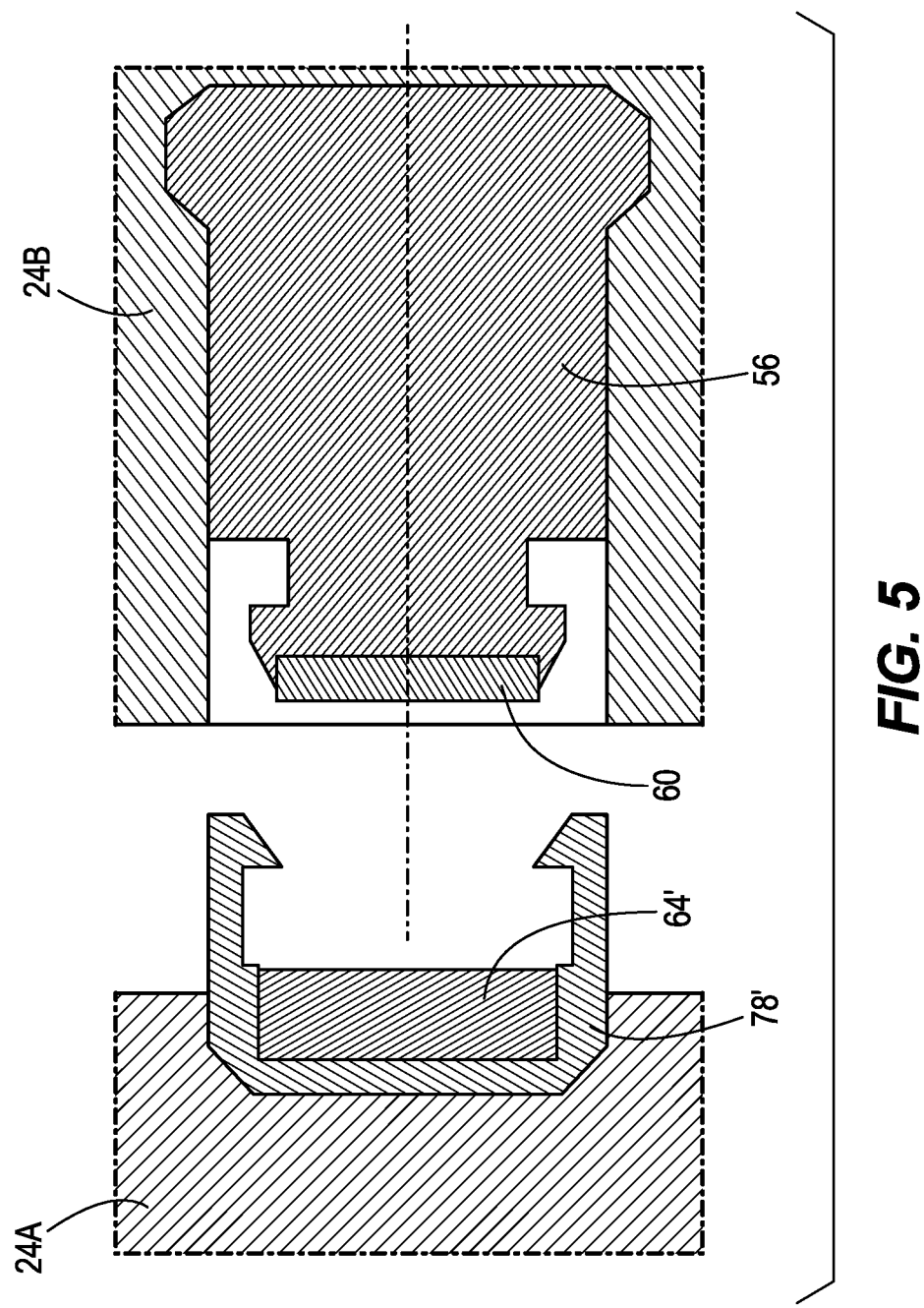
FIG. 5 illustrates the serviceability of the embedded encryption device with a replacement RFID circuit for connection with the LTCC pin grid array.

With particular reference to FIG. 1A, it is noted that the LTCC pin grid array 60 is supported at a distal end of the ceramic carrier 56 at or adjacent the parting line where the joint 28 is formed between the housing bodies 24A, 24B. The encryption device 52 is configured such that the RFID circuit 64 is clipped onto the ceramic carrier 56 and configured to separate from the ceramic carrier 56 upon separation of the housing bodies 24A, 24B at the parting line. As illustrated, the RFID circuit 64 is embedded in a tamper-proof single-use connector 78 that mates with the ceramic carrier 56. For example, the single-use connector 78 can mate with the ceramic carrier 56 in a snap-on configuration and can incorporate an area of structural weakening configured to break apart in lieu of releasing from the ceramic carrier 56 intact. In the illustrated example, a barbed end of the single-use connector 78 snaps into a groove or recess on the outside surface of the ceramic carrier 56. Once assembled, there is not adequate access to manipulate and radially expand the connector 78 for removal from the ceramic carrier 56. Disassembly is also precluded by the limited radial space around the ceramic carrier 56 and the single-use connector 78. The single-use connector 78 cannot be removed from the ceramic carrier 56 without damage to one or both of the ceramic carrier 56 and the single-use connector 78. For example, the single-use connector 78 can include structural weakening to define a mechanical failure point. In some constructions an adhesive may be applied, e.g., in lieu of clipping, and the adhesive is configured to destroy the circuit upon removal or disassembly. The single-use connector 78 can be embedded (e.g., epoxied) into the housing body 24A, and the RFID circuit 64 fastened securely therewith (e.g., epoxied), such that the RFID circuit 64 will stay with the single-use connector 78 and separate from the LTCC pin grid array 60 in the event of separation of the product housing bodies 24A, 24B along the parting line. Such separation requires breakage of the original joint 28 and renders the RFID circuit 64 inoperable to report the encrypted confirmation signal to the RFID reader 68. Breaking of the original joint 28 renders the housing bodies 24A, 24B separable to either establish access or increase access to the inner workings of the product 20. In the one illustrated embodiment, for example, separation of the housing bodies 24A, 24B after breaking the original joint 28 would facilitate an end user's ability to swap pump components such as pistons, seals, shoes, springs, and/or bearings with any desired components available to them, without knowledge or authorization of the original equipment manufacturer Beyond rendering the RFID circuit 64 inoperable to report the encrypted confirmation signal while the housing bodies 24A, 24B are separated, the RFID circuit 64 is programmed to prevent future reporting of the confirmation signal upon detecting detachment of the LTCC pin grid array 60 from the passive RFID circuit 64. For example, software for communicating the confirmation signal to the RFID reader 68 is programmed to self-terminate and optionally delete the source code from the RFID circuit 64 in response to severing the connections between the RFID circuit's digital I/O pins and the LTCC pin grid array 60. In one such construction, one of the pins is used as a "handshake" between the LTCC pin grid array 60 and the RFID circuit 64, and if this link is broken, the software executes a different routine that leads to the detection or loss of signal. As such, any successful receipt of the confirmation signal by the RFID reader 68 not only confirms product authenticity, but also the integrity of the original joint 28 as representing an unopened product housing. Thus, the inner workings can be relied upon to be all original as provided by the original equipment manufacturer at the time of original manufacture. In other words, the product 20 can be confirmed to be authentic and containing original parts within the housing at any point in time that the original joint 28 remains unbroken, but at no time thereafter. Despite this, the product 20 can be serviced by the original equipment manufacturer in a manner that involves providing a replacement RFID circuit 64' in a replacement single-use connector 78' to either the original housing body 24A or a replacement as shown in FIG. 5. Authorized software running on a service tool from or authorized by original equipment manufacturer is then used to program the replacement RFID circuit 64'.

The present disclosure provides an anti-counterfeit technology to be embedded into industrial or vehicle components, e.g., construction equipment or automotive parts/subassemblies, etc. In addition to enabling RF electronic verification of authenticity once assembled and programmed by the original equipment manufacturer, the machine/component (referred to above as the "product 20") being opened up by a third party (to modify/service/inspect) severs the RFID circuit 64 from the coded LTCC device 60 as described above to self-terminate and optionally delete the source code. Thus, a lasting indicator is provided that the machine/component has been previously opened. Upon opening of the product 20, the embedded authentication system self-destructs and will no longer be identifiable by RFID communication from the reader 68, even if carefully put back together. This can be useful in a situation where a product is returned under warranty as defective. The original equipment manufacturer can confirm that this is in fact their manufactured component, and it has not been opened/serviced/modified elsewhere. The self-destructing authentication system remains at least partially re-usable and enables authorized service by the original equipment manufacturer, in accordance with the description of FIG. 5 above.

Figure 6:
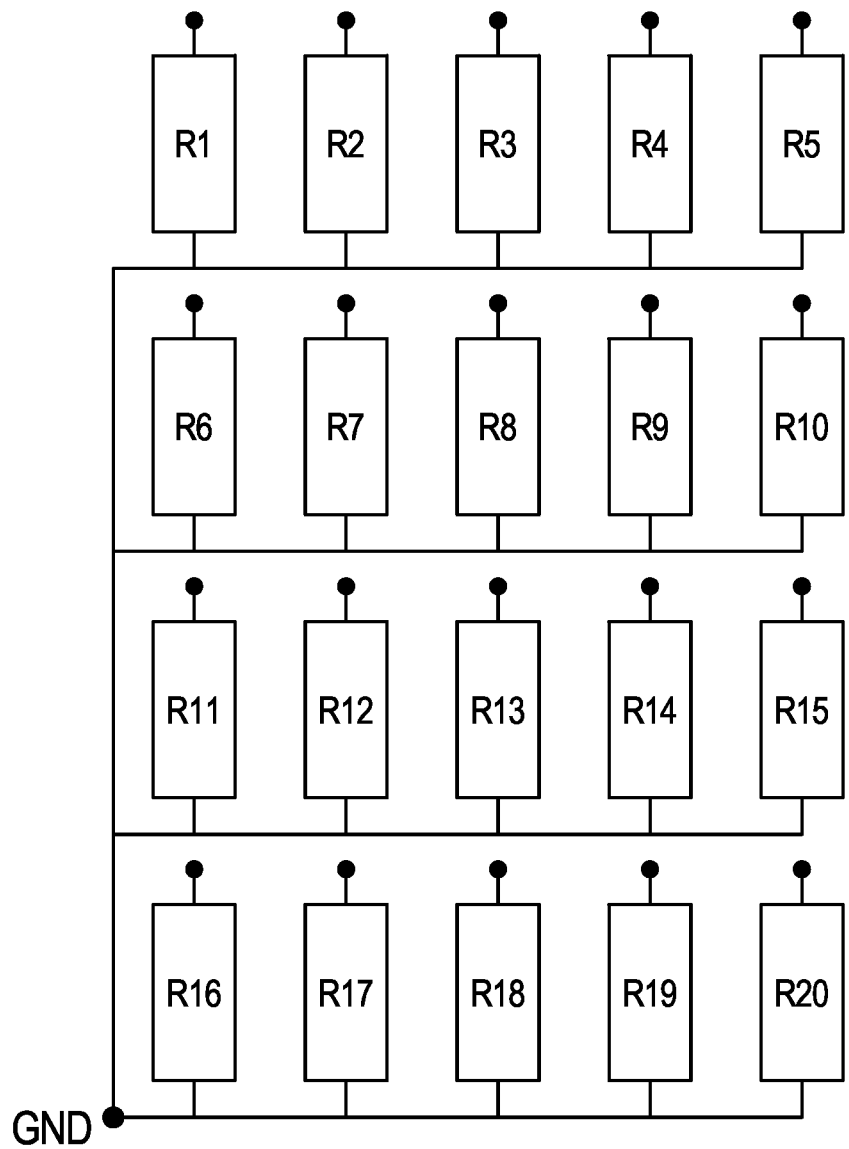
FIG. 6 illustrates an encryption-coded resistor-based pin grid array for the embedded encryption device.

Although the embodiment described above provides numerous features and advantages by way of a digital pin grid array, aspects of the invention may also encompass a similar operation, though provided by analog components that provide the unique encrypted identification code or "fingerprint." As shown in FIG. 6, an analog pin grid array 160 can be provided by a resistor array, including a plurality of resistors R1, R2, etc. each of which can have a particular resistance value or level. Each resistor is connected between a corresponding dedicated contact position, illustrated by the black dots, and a common ground GND. For example, each given resistor in the array can have a resistance between a lower limit value (e.g., 10 Ohms) and an upper limit value (e.g., 1 Mega-Ohm). The various possible resistance values can vary among prescribed steps. For example, each resistor can be printed of conductive material and subsequently trimmed to 1 percent accuracy, with the steps 2 percent apart. Such an arrangement can provide, within a reasonable resistance range, 285 steps in resistance values. Having such a number of steps in resistor values, 1.54e44 unique identification codes or fingerprints can be provided with just 18 total resistors on each substrate in order to at least match the number of unique identification codes afforded by the 12×12 digital pin grid array of the preceding embodiment. In the embodiment of FIG. 6, a 5×4 grid layout is used to provide 20 total resistors R1 to R20. The resistor array can fit on a ceramic base of 25 mm×20 mm in some constructions.

Although rectangular grid patterns or arrays are suggested above and illustrated, it should be noted that, in the case of either analog or digital "fingerprint" coding, grid patterns can be Cartesian/orthogonal, or any other shape, such as circular (e.g., polar coordinates) or any arbitrary point distribution in x/y coordinates.

Although the invention has been described in detail with reference to certain preferred embodiments, variations and modifications exist within the scope and spirit of one or more independent aspects of the invention as described.

What is claimed is:

1. An anti-counterfeit product of manufacture comprising:
a housing defining a cavity, the housing constructed of a first body and a second body forming an original joint with the first body at a parting line;
electrical and/or mechanical inner workings of the product enclosed within the cavity; and an encryption device comprising
an encryption-coded ceramics-based pin grid array embedded in the first body of the housing, and
an RFID circuit connected with the ceramics-based pin grid array and configured to report out a confirmation signal based on the code set by the connected ceramics-based pin grid array upon an interrogation trigger from an RFID reader,
wherein the RFID circuit is programmed to prevent future reporting of the confirmation signal upon detachment of the ceramics-based pin grid array from the RFID circuit, such that the presence of the confirmation signal is configured to confirm both product authenticity and integrity of the original joint.

2. The anti-counterfeit product of manufacture of claim 1, wherein the encryption-coded ceramics-based pin grid array is supported on a ceramic carrier that is embedded in the first body of the housing, the first body being constructed as a plastic or metal casting.

3. The anti-counterfeit product of manufacture of claim 2, wherein the ceramics-based pin grid array is supported at a distal end of the ceramic carrier adjacent the parting line.

4. The anti-counterfeit product of manufacture of claim 2, wherein the RFID circuit is mated with the ceramic carrier by a connector that separates the RFID circuit from the ceramic carrier upon separation of the first and second bodies of the housing at the parting line.

5. The anti-counterfeit product of manufacture of claim 4, wherein the connector is a tamper-proof single-use connector that clips onto the ceramic carrier, and wherein the RFID circuit is embedded in the connector.

6. The anti-counterfeit product of manufacture of claim 1, wherein ceramics-based pin grid array is a low temperature co-fired (LTCC) pin grid array.

7. The anti-counterfeit product of manufacture of claim 1, wherein the ceramics-based pin grid array is a digital 12×12 pin grid array with one pin position reserved for electrical ground, providing 143-bit encryption coding.

8. The anti-counterfeit system of claim 1, wherein the ceramics-based pin grid array is an analog resistor array having a unique combination of preselected resistor values.

9. The anti-counterfeit product of manufacture of claim 1, wherein the product is a pump, one of the first and second bodies of the housing provided as a main housing in which a pumping mechanism is received, and the other of the first and second bodies of the housing provided as a port block of the pump.

10. A vehicle including the anti-counterfeit product of manufacture of claim 1, wherein the product forms a functional component of the vehicle, and wherein an electronic control unit of the vehicle provides the RFID reader operable to provide the interrogation trigger.

11. An anti-counterfeit system comprising:
an authentic product of manufacture including a housing constructed of a first body and a second body forming an original joint with the first body at a parting line;
electrical and/or mechanical inner workings of the product enclosed within the cavity;
an RFID reader; and
an encryption device built into the product, the encryption device comprising
an encryption-coded ceramics-based pin grid array embedded in the first body of the housing, and
an RFID circuit connected with the ceramics-based pin grid array and configured to report out a confirmation signal based on the code set by the connected ceramics-based pin grid array upon an interrogation trigger from the RFID reader,
wherein the RFID circuit is programmed to prevent future reporting of the confirmation signal upon detachment of the ceramics-based pin grid array from the RFID circuit, such that the presence of the confirmation signal is configured to confirm both product authenticity and integrity of the original joint.

12. The anti-counterfeit system of claim 11, wherein the encryption-coded ceramics-based pin grid array is supported on a ceramic carrier that is embedded in the first body of the housing, the first body being constructed as a plastic or metal casting.

13. The anti-counterfeit system of claim 12, wherein the ceramics-based pin grid array is supported at a distal end of the ceramic carrier adjacent the parting line.

14. The anti-counterfeit system of claim 12, wherein the RFID circuit is mated with the ceramic carrier via a connector that separates the RFID circuit from the ceramic carrier upon separation of the first and second bodies of the housing at the parting line.

15. The anti-counterfeit system of claim 14, wherein the connector is a tamper-proof single-use connector that clips onto the ceramic carrier, and wherein the RFID circuit is embedded in the connector.

16. The anti-counterfeit system of claim 11, wherein ceramics-based pin grid array is a low temperature co-fired (LTCC) pin grid array.

17. The anti-counterfeit system of claim 11, wherein the ceramics-based pin grid array is a digital 12×12 pin grid array with one pin position reserved for electrical ground, providing 143-bit encryption coding.

18. The anti-counterfeit system of claim 11, wherein the ceramics-based pin grid array is an analog resistor array having a unique combination of preselected resistor values.

19. The anti-counterfeit product of manufacture of claim 11, wherein the product is a pump, one of the first and second bodies of the housing provided as a main housing in which a pumping mechanism is received, and the other of the first and second bodies of the housing provided as a port block of the pump.

20. A vehicle including the anti-counterfeit system of claim 11, wherein the product forms a functional component of the vehicle, and wherein an electronic control unit of the vehicle provides the RFID reader operable to provide the interrogation trigger.

* * * * *